US012619932B2

(12) United States Patent
Ezrielev et al.

(10) Patent No.: US 12,619,932 B2
(45) Date of Patent: May 5, 2026

(54) VALUE CHAIN WORKLOAD AUTOSCALING IN AN INDUSTRY CLOUD

(71) Applicant: Dell Products L.P., Round Rock, TX (US)

(72) Inventors: Ofir Ezrielev, Be'er Sheva (IL); Shahed Yousef, Kfar Kasem Central (IL); Sharon Vitek, Tel-Aviv (IL)

(73) Assignee: DELL PRODUCTS L.P., Round Rock, TX (US)

( * ) Notice: Subject to any disclaimer, the term of this patent is extended or adjusted under 35 U.S.C. 154(b) by 105 days.

(21) Appl. No.: 18/644,968

(22) Filed: Apr. 24, 2024

(65) Prior Publication Data

US 2025/0335848 A1 Oct. 30, 2025

(51) Int. Cl.
G06Q 10/0633 (2023.01)

(52) U.S. Cl.
CPC ................................ G06Q 10/0633 (2013.01)

(58) Field of Classification Search
CPC .................................................. G06Q 10/0633
See application file for complete search history.

(56) References Cited

U.S. PATENT DOCUMENTS 7,162,318 B1 * 1/2007 Brearley ............ G06Q 10/0631
705/7.12
12,106,147 B2 * 10/2024 Guo ...................... G06F 9/5005

2007/0220149 A1 * 9/2007 Kawashima ........ H04L 67/1008
709/226
2008/0164998 A1 * 7/2008 Scherpbier ............. G16H 40/20
340/539.13
2008/0172673 A1 * 7/2008 Naik ...................... G06F 9/5083
718/104

(Continued)

FOREIGN PATENT DOCUMENTS

CN 107301466 A * 10/2017 ............. G06Q 10/04

OTHER PUBLICATIONS

Alharti et al. "Auto-Scaling Techniques in Cloud Computing: Issues and Research Directions" (2024) (https://pmc.ncbi.nlm.nih.gov/articles/PMC11398277/) (Year: 2024).*

*Primary Examiner* — Sujay Koneru
(74) *Attorney, Agent, or Firm* — Amin, Turocy & Watson, LLP

(57) ABSTRACT

The technology described herein is directed towards automatically scaling cloud provider resources allocated for one enterprise's service based on the resources being used or expected to be used by another enterprise's service, in which there is a value chain-based load-dependency relationship between the two enterprises' services. In one example implementation, a first prediction engine determines a predicted workload for a first enterprise service, and sends that information to a load manager that allocates resources for the first enterprise service based on the prediction. Based on the load-dependency relationship, the first prediction engine sends the predicted workload to a second prediction engine, which predicts a second predicted workload for a second enterprise's service, and sends the second prediction information to a load manager that allocates resources for the second enterprise service based on the second prediction. The automatic scaling is done without sharing any enterprise-sensitive data among the enterprises.

20 Claims, 10 Drawing Sheets

(56)     References Cited

U.S. PATENT DOCUMENTS

| | | | |
|---|---|---|---|
| 2009/0171718 A1* | 7/2009 | Barlow .............. | G06Q 10/0633 |
| | | | 705/7.27 |
| 2011/0167424 A1* | 7/2011 | Murthy ................ | G06F 9/4881 |
| | | | 709/224 |
| 2013/0144652 A1* | 6/2013 | Roberson .............. | G16H 50/30 |
| | | | 705/3 |
| 2016/0156568 A1* | 6/2016 | Naganuma ............. | G06F 16/21 |
| | | | 709/226 |
| 2018/0367672 A1* | 12/2018 | Ristock .............. | H04M 3/5238 |
| 2020/0073342 A1* | 3/2020 | Lee ........................ | G05B 17/02 |
| 2020/0183743 A1* | 6/2020 | Moore ................ | G06F 9/5061 |
| 2020/0272517 A1* | 8/2020 | Trigalo ................ | G06F 9/5005 |
| 2020/0401449 A1* | 12/2020 | Zhang ................ | G06F 9/5072 |
| 2020/0401947 A1* | 12/2020 | Jha ........................ | G06F 9/5027 |
| 2020/0412663 A1* | 12/2020 | Bryc ..................... | H04L 67/60 |
| 2022/0138015 A1* | 5/2022 | Verma ................... | G06F 9/5072 |
| | | | 709/226 |
| 2022/0343250 A1* | 10/2022 | Tremblay .............. | G06F 3/0482 |
| 2022/0374273 A1* | 11/2022 | Eldar ................... | G06F 16/254 |
| 2024/0272942 A1* | 8/2024 | Peng ..................... | G06F 9/4856 |
| 2025/0004803 A1* | 1/2025 | Mandal .............. | G06F 9/45558 |
| 2025/0119885 A1* | 4/2025 | Alasti .............. | H04W 72/0453 |

* cited by examiner

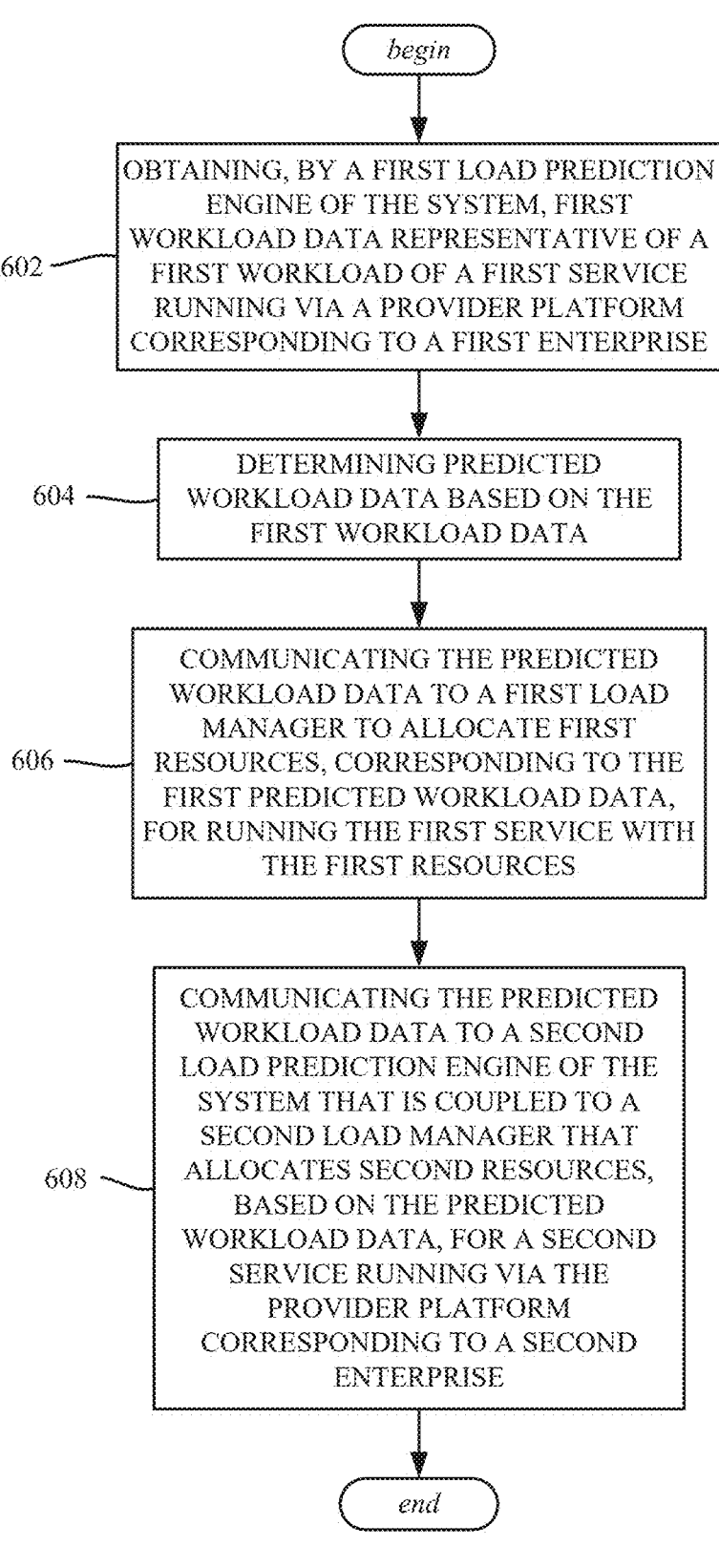

begin

602 — OBTAINING, BY A FIRST LOAD PREDICTION ENGINE OF THE SYSTEM, FIRST WORKLOAD DATA REPRESENTATIVE OF A FIRST WORKLOAD OF A FIRST SERVICE RUNNING VIA A PROVIDER PLATFORM CORRESPONDING TO A FIRST ENTERPRISE

604 — DETERMINING PREDICTED WORKLOAD DATA BASED ON THE FIRST WORKLOAD DATA

606 — COMMUNICATING THE PREDICTED WORKLOAD DATA TO A FIRST LOAD MANAGER TO ALLOCATE FIRST RESOURCES, CORRESPONDING TO THE FIRST PREDICTED WORKLOAD DATA, FOR RUNNING THE FIRST SERVICE WITH THE FIRST RESOURCES

608 — COMMUNICATING THE PREDICTED WORKLOAD DATA TO A SECOND LOAD PREDICTION ENGINE OF THE SYSTEM THAT IS COUPLED TO A SECOND LOAD MANAGER THAT ALLOCATES SECOND RESOURCES, BASED ON THE PREDICTED WORKLOAD DATA, FOR A SECOND SERVICE RUNNING VIA THE PROVIDER PLATFORM CORRESPONDING TO A SECOND ENTERPRISE end

FIG. 6

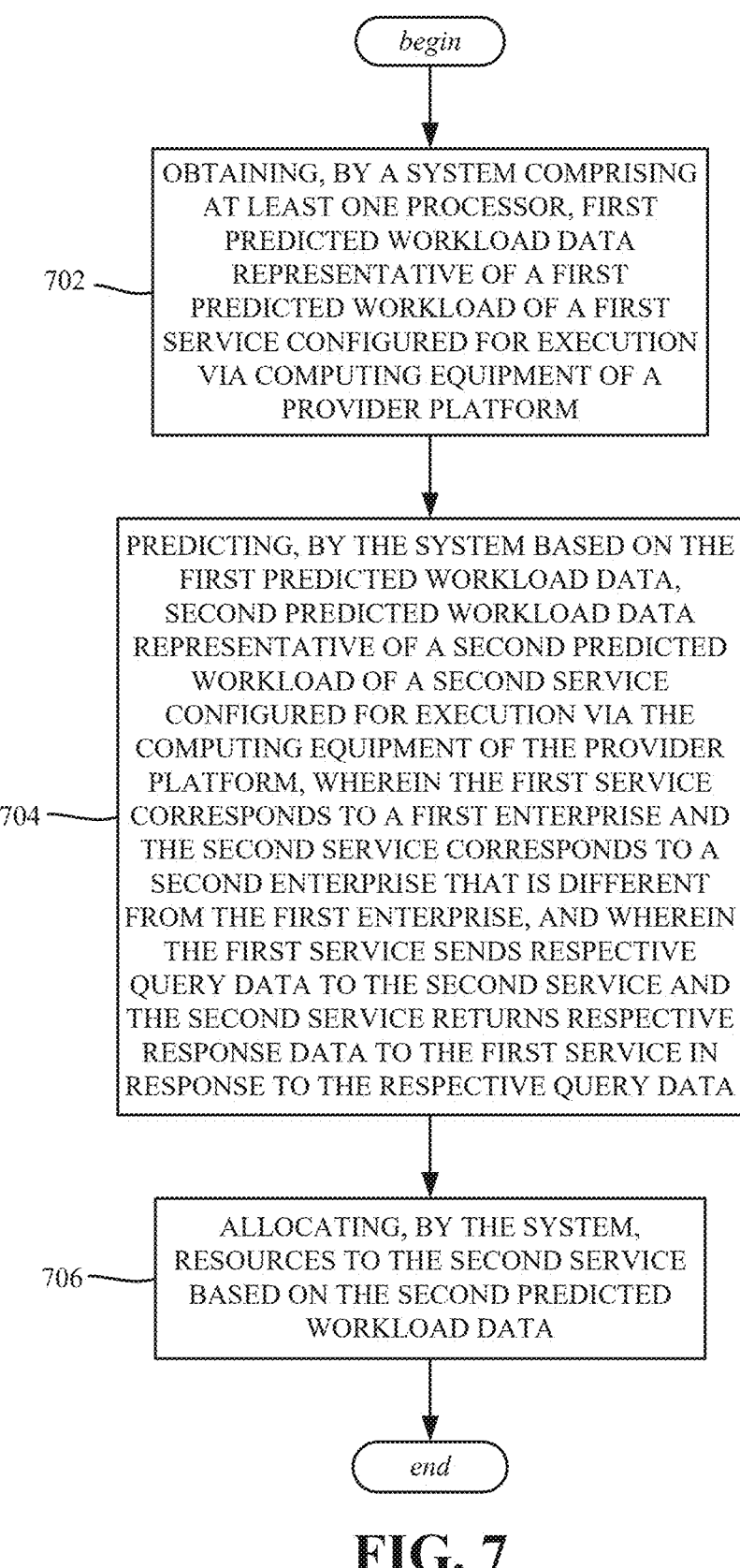

begin

702 — OBTAINING, BY A SYSTEM COMPRISING AT LEAST ONE PROCESSOR, FIRST PREDICTED WORKLOAD DATA REPRESENTATIVE OF A FIRST PREDICTED WORKLOAD OF A FIRST SERVICE CONFIGURED FOR EXECUTION VIA COMPUTING EQUIPMENT OF A PROVIDER PLATFORM

704 — PREDICTING, BY THE SYSTEM BASED ON THE FIRST PREDICTED WORKLOAD DATA, SECOND PREDICTED WORKLOAD DATA REPRESENTATIVE OF A SECOND PREDICTED WORKLOAD OF A SECOND SERVICE CONFIGURED FOR EXECUTION VIA THE COMPUTING EQUIPMENT OF THE PROVIDER PLATFORM, WHEREIN THE FIRST SERVICE CORRESPONDS TO A FIRST ENTERPRISE AND THE SECOND SERVICE CORRESPONDS TO A SECOND ENTERPRISE THAT IS DIFFERENT FROM THE FIRST ENTERPRISE, AND WHEREIN THE FIRST SERVICE SENDS RESPECTIVE QUERY DATA TO THE SECOND SERVICE AND THE SECOND SERVICE RETURNS RESPECTIVE RESPONSE DATA TO THE FIRST SERVICE IN RESPONSE TO THE RESPECTIVE QUERY DATA

706 — ALLOCATING, BY THE SYSTEM, RESOURCES TO THE SECOND SERVICE BASED ON THE SECOND PREDICTED WORKLOAD DATA end

FIG. 7

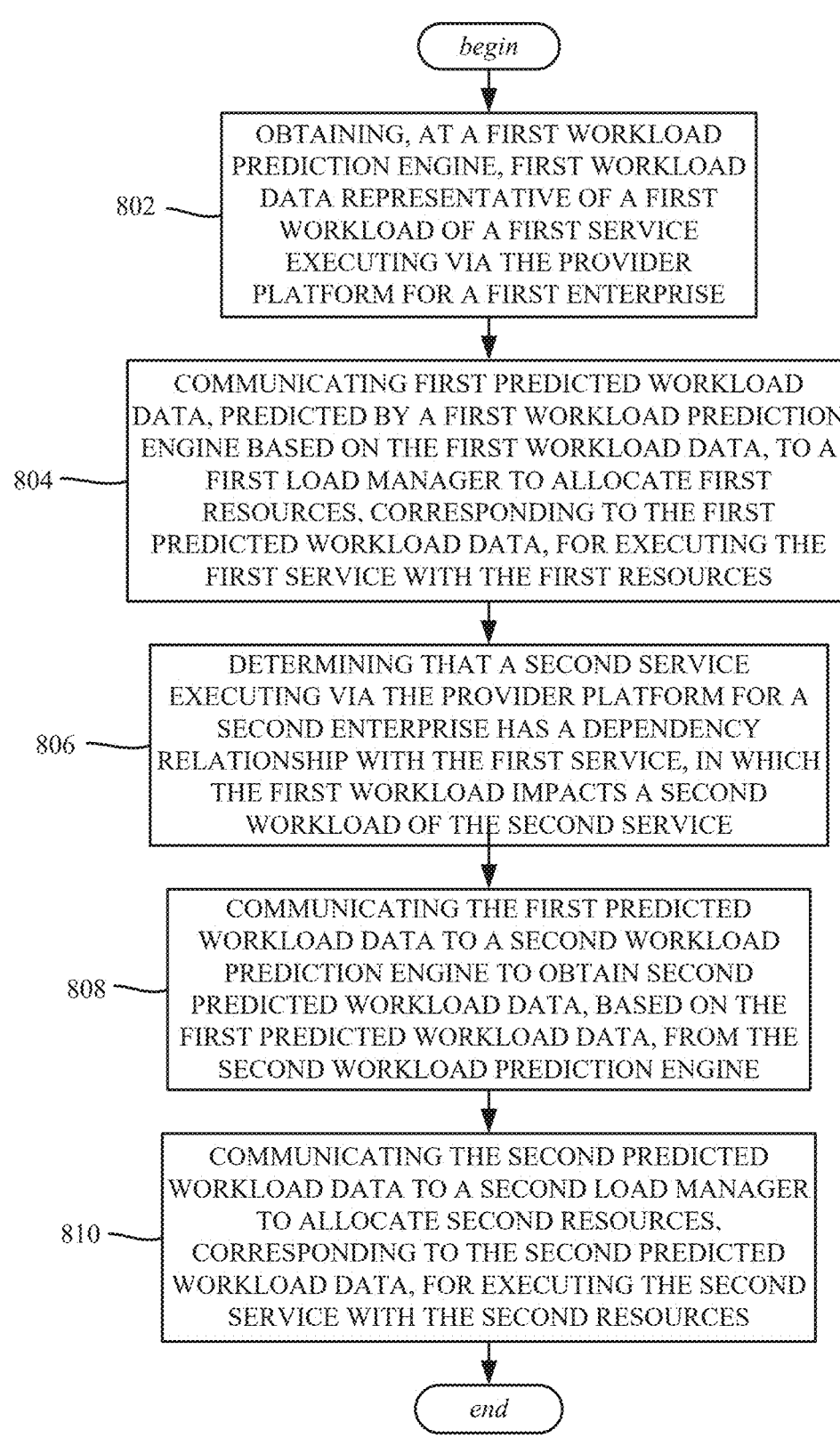

begin

OBTAINING, AT A FIRST WORKLOAD PREDICTION ENGINE, FIRST WORKLOAD DATA REPRESENTATIVE OF A FIRST WORKLOAD OF A FIRST SERVICE EXECUTING VIA THE PROVIDER PLATFORM FOR A FIRST ENTERPRISE — 802

COMMUNICATING FIRST PREDICTED WORKLOAD DATA, PREDICTED BY A FIRST WORKLOAD PREDICTION ENGINE BASED ON THE FIRST WORKLOAD DATA, TO A FIRST LOAD MANAGER TO ALLOCATE FIRST RESOURCES, CORRESPONDING TO THE FIRST PREDICTED WORKLOAD DATA, FOR EXECUTING THE FIRST SERVICE WITH THE FIRST RESOURCES — 804

DETERMINING THAT A SECOND SERVICE EXECUTING VIA THE PROVIDER PLATFORM FOR A SECOND ENTERPRISE HAS A DEPENDENCY RELATIONSHIP WITH THE FIRST SERVICE, IN WHICH THE FIRST WORKLOAD IMPACTS A SECOND WORKLOAD OF THE SECOND SERVICE — 806

COMMUNICATING THE FIRST PREDICTED WORKLOAD DATA TO A SECOND WORKLOAD PREDICTION ENGINE TO OBTAIN SECOND PREDICTED WORKLOAD DATA, BASED ON THE FIRST PREDICTED WORKLOAD DATA, FROM THE SECOND WORKLOAD PREDICTION ENGINE — 808

COMMUNICATING THE SECOND PREDICTED WORKLOAD DATA TO A SECOND LOAD MANAGER TO ALLOCATE SECOND RESOURCES, CORRESPONDING TO THE SECOND PREDICTED WORKLOAD DATA, FOR EXECUTING THE SECOND SERVICE WITH THE SECOND RESOURCES — 810 end

FIG. 8

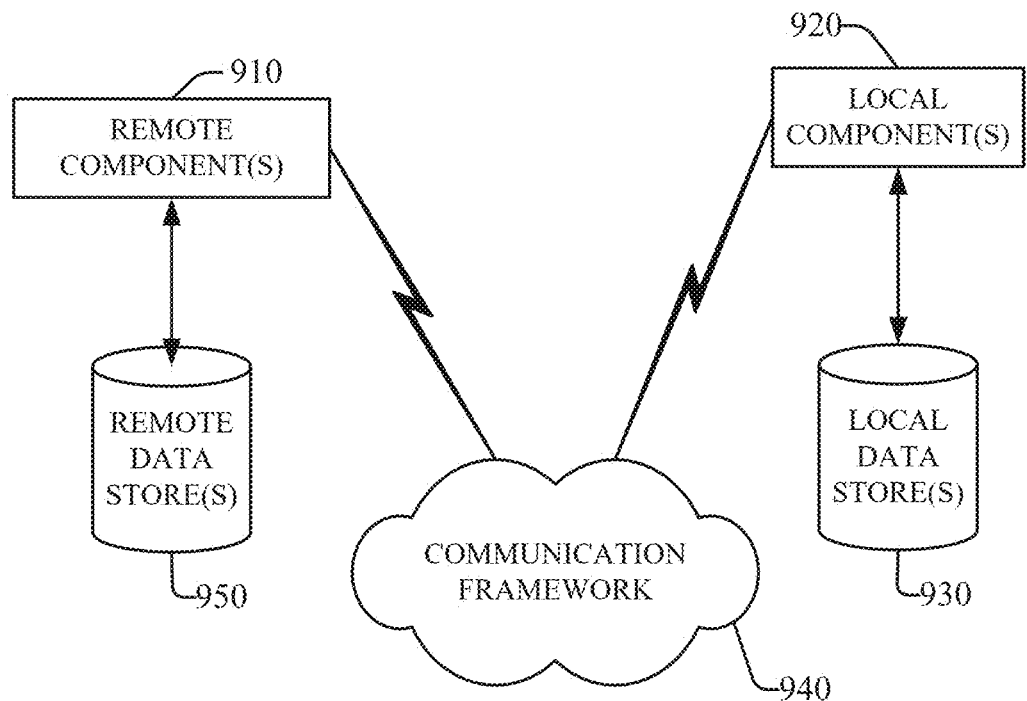
FIG. 9

VALUE CHAIN WORKLOAD AUTOSCALING IN AN INDUSTRY CLOUD

BACKGROUND

An industry (vertical) cloud is a set of packaged cloud products, full-service offerings or frameworks configured for an industry or several industries across a value chain, where "value chain" refers to a combination of different services that provide a full product solution. A value chain may encompass more than one company (e.g., a financial technology, or 'fintech', company that draws data from banks and credit providers to provide insights to end customers).

Industry cloud platforms are designed to cater to the specific needs of vertical industry segments inadequately served by generic solutions. On these platforms, it is common to find applications that are based on services by different companies merged into a single workflow, where "workflow" includes the structure and amount, or number, of resources and time that are used in a system in the context of completing a task.

BRIEF DESCRIPTION OF THE DRAWINGS

The technology described herein is illustrated by way of example and not limited in the accompanying figures in which like reference numerals indicate similar elements and in which:

FIG. 6 is a flow diagram showing example operations related to determining predicted workload data based on first workload data of a first service running via a provider platform, and allocating second resources for a second running service based on the predicted workload data, in accordance with various embodiments and implementations of the subject disclosure.

FIG. 7 is a flow diagram showing example operations related to allocating resources to a second service based on second predicted workload data that is determined based on first predicted workload data of a first service, in accordance with various embodiments and implementations of the subject disclosure.

FIG. 8 is a flow diagram showing example operations related to determining first predicted workload data of a first service and allocating resources to a second service based on the first predicted workload data, in accordance with various embodiments and implementations of the subject disclosure.

FIG. 9 is a block diagram representing an example computing environment into which embodiments of the subject matter described herein may be incorporated.

DETAILED DESCRIPTION

Figure 1:
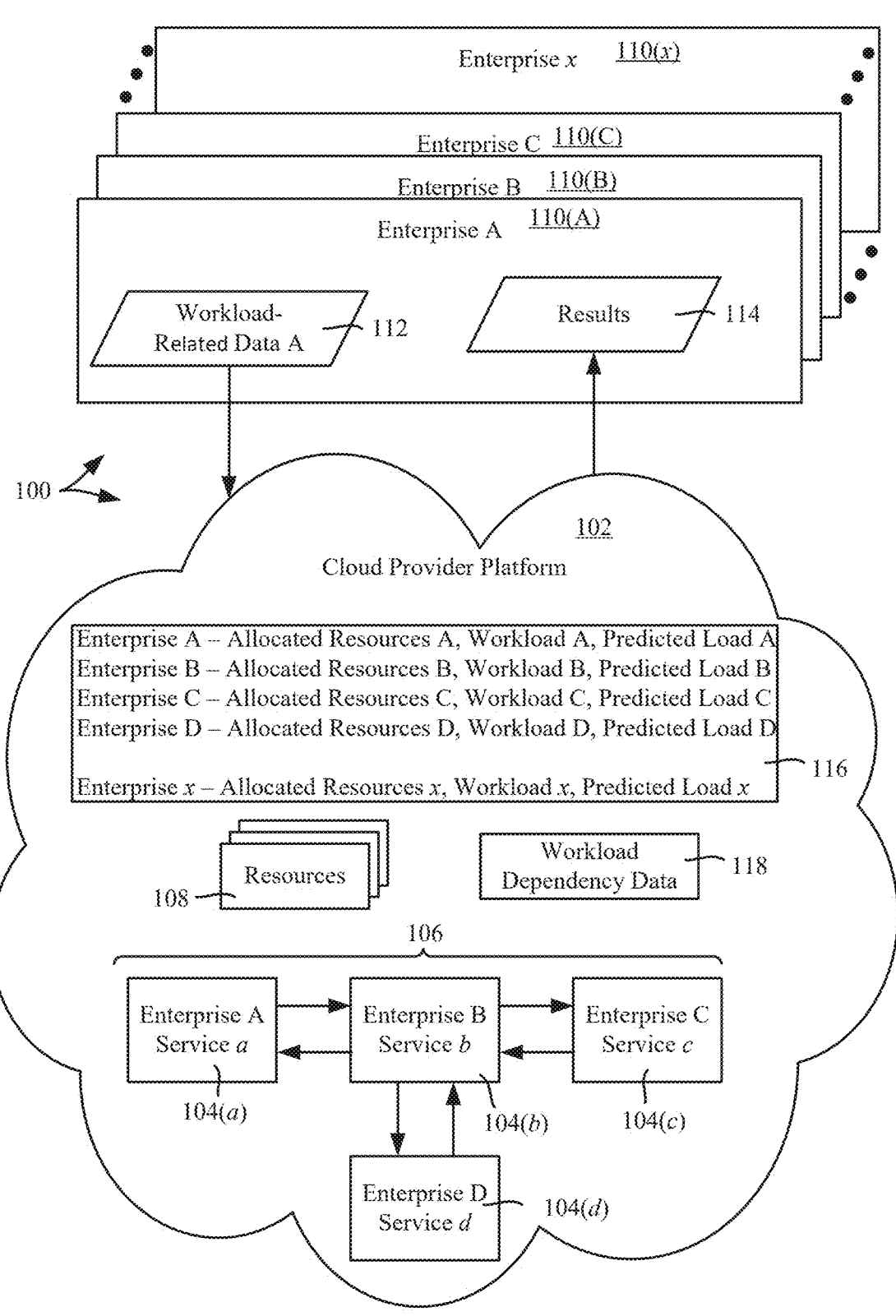
FIG. 1 is a block diagram showing an example system for automatically scaling services based on dependency relationships between those services, in accordance with various embodiments and implementations of the subject disclosure.

The technology described herein is generally directed towards automatically scaling cloud provider resources allocated for one enterprise's service based on the resources being used or expected to be used by another enterprise's service, in which there is a load-dependency relationship between the two enterprise's services. By way of example, consider that one enterprise's service (e.g., a lending company) makes queries to another enterprise (e.g., a credit monitoring company) to obtain credit scores for potential borrowers. If the lending enterprise needs its cloud resources scaled up to handle a large number of actual or expected requests, then the cloud resources currently allocated to the credit monitoring company may be inadequate to efficiently process and respond to the incoming queries from the lending company. Rather than waiting for the credit monitoring company's service to become a bottleneck because of the inadequate cloud resources currently allocated to the credit monitoring service, as spinning up additional resources takes time, the technology described herein predicts the need for additional cloud resources by the credit monitoring company's service, and proactively allocates the additional cloud resources to its service, including spinning them up as appropriate.

To this end, a workload graph or the like tracks load-dependency relationships between services of different enterprises, for use by a single cloud provider/manager that is aware of the services' workloads and service level objectives (SLOs)/service level agreements (SLAs). Telemetry data or the like can be collected by the provider that represents the workflow of workloads that are shared between enterprises.

In one example implementation, based on the relationships and the shared workloads, a first prediction engine determines a predicted workload for a first enterprise service, and sends that information to a load manager that allocates resources for the first enterprise service based on the prediction. Further, the first prediction engine sends the predicted workload to a second prediction engine, which predicts a second predicted workload for a second enterprise service (having a value chain-based dependency relationship with the first enterprise service), and sends the second prediction information to a load manager that allocates resources for the second enterprise service based on the second prediction. Thus, the provider manages and automatically scales related enterprise services' workloads based on each other's situation and needs. Note that while this is done in an automatic way, the cloud provider does the automatic scaling based on predicted workload information or workloads within the cloud provider platform, without sharing any enterprise-sensitive data among the entities.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in cloud computing and workload management in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a generalized block diagram of an example system 100 including a cloud provider platform 102 in which various services 104($a$)-104($d$) are running in a value chain 106 in the cloud provider platform 102, using resources 108 of the cloud provider platform 102. The various services 104($a$)-104($d$) can be of different enterprises (e.g., companies) 110(A)-110($x$), whereby each enterprise's workload data and SLA/SLOs for operations of the enterprise, which are considered to be sensitive data, are not shared to other enterprises, including other enterprises having services in the value chain.

In general, an enterprise (e.g., 110(A)) sends workload-related data (e.g., 112) directed to one or more of its services running in the cloud provider 102, such as requests to be processed by its service (e.g., 104($a$)). Once processed, the service 104($a$) returns results 114 to the enterprise 110(A). In this way, for example, a lender can provide various workload-related data regarding a particular identified borrower and receive a result, such as terms of a loan offer, e.g., X percent over a Y timeframe.

In the example of FIG. 1, consider that the service 104($a$) sends a request (query) to the service 104($b$), and receives a response therefrom. To obtain the resultant response, the service 104($b$) queries the service 104($c$) and/or the service 104($d$), to obtain their responses, respectively, and process those responses for returning to the service 104($a$). Thus, the value chain 106 in this example includes the services 104($a$)-104($d$).

The cloud provider platform 102 tracks (block 116) the resources allocated to the enterprise A 110(A), (e.g., per service/workload), and so on for the resources allocated to other enterprises/their respective workloads. Further, based on information available to the cloud provider platform 102, such as learned from the SLA/SLOs for the enterprises and/or prior interaction data, the cloud provider platform 102 maintains workload dependency data 118, including workload dependency data corresponding to the value chain 106. In this example, the workload dependency data 116 represents that the workload of the service 104($b$) depends on the workload of the service 104($a$), and that the workload of the services 104($c$) and 104($d$) depends on the workload of the service 104($b$), (and thus indirectly on the workload of the service 104($a$)).

Described herein is leveraging this workload dependency data 116 to scale resources of a load-dependent service automatically based on the load of the service that is causing its load to fluctuate. Note that in existing technology, resources for each individual service are independently controlled, whereby if a rise in workload is identified for one service, only the specific service noticing the increase adjusts its resources (or has its resources adjusted by a load manager or the like) accordingly; thus, in existing technology the service 104($b$) would not begin scaling up until the (large number) of requests from the service 104($a$) were already pending.

When there are multiple enterprises' workloads in the same value chain, which are manageable by a single cloud provider (e.g., a manager therein), the multiple enterprises' workloads can be managed as described herein to improve collaboration that can affect SLA/SLO adherence, without sharing workload information between them. In general, a circulation problem is based on a generalization of network flow problems, with the added constraint of a lower bound on edge flows, and with flow conservation also being needed for the source node and sink node (i.e., there are no special nodes). In variants of the circulation problem, there are multiple commodities flowing through the network, and a cost on the flow. When there are multiple companies' workloads in the same value chain manageable by a single cloud provider/manager, the technology described herein can adjust resources based on the multiple enterprises' workloads without sharing workload information between them.

In general, for one implementation of the technology to operate, consider that two enterprises have workloads managed by the same provider, that the provider has visibility into telemetry data of each customer and its architecture, and that the enterprises' SLAs/SLOs are shared with this provider. Nonlimiting examples for which this is relevant include the domains of financial-related information (e.g., fintech) and healthcare-related information, where the owners of the data may provide access to their data for third-party operations. The provider can be a multi-cloud enabler, or a public cloud provider.

Figure 2:
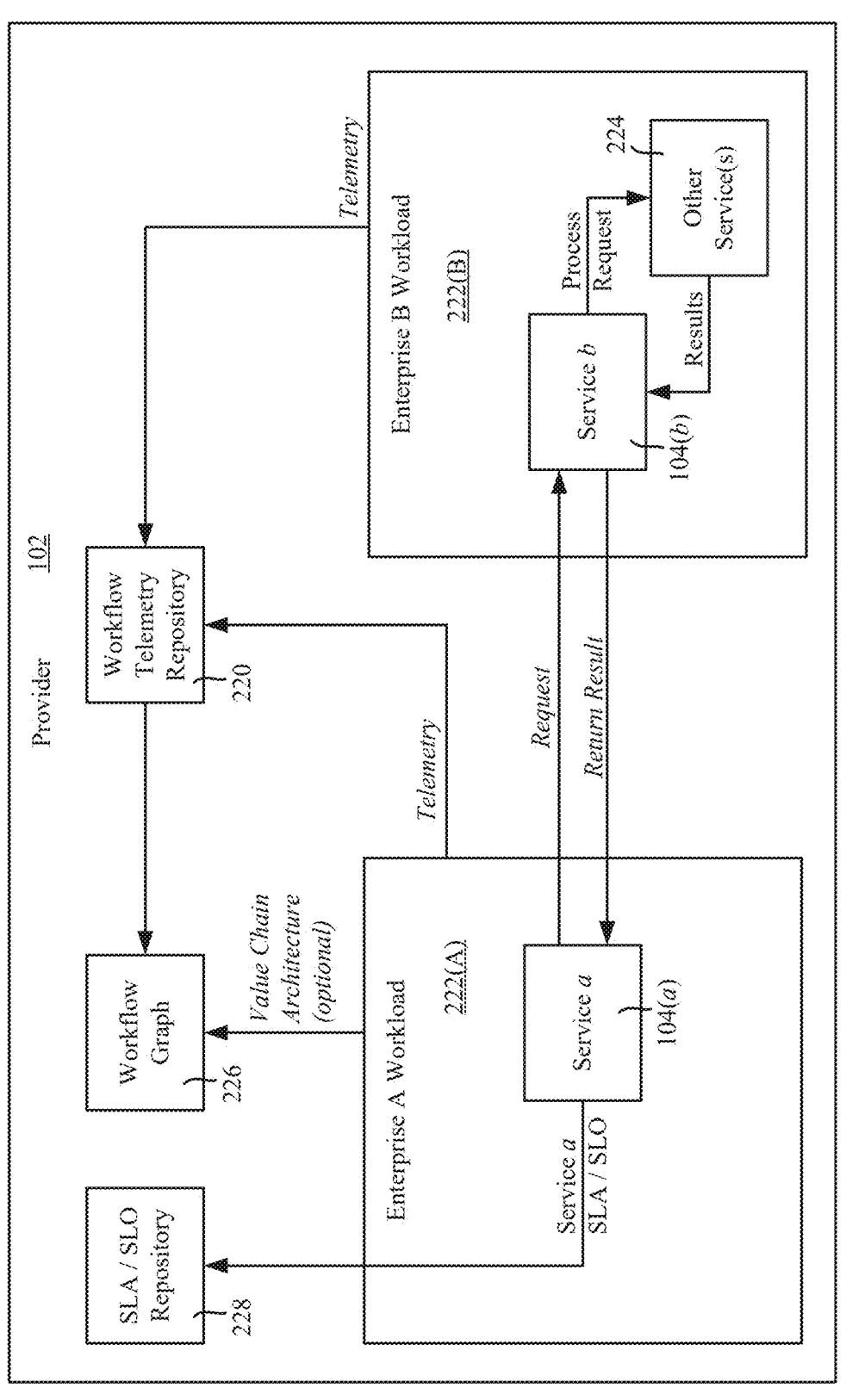
FIG. 2 is a block diagram showing an example workflow for two enterprises operating as part of a value chain, in which one enterprise's service workload impacts the other enterprise's service workload, in accordance with various embodiments and implementations of the subject disclosure.

As shown in FIG. 2, the provider 102 can collect telemetry (block 220) about the workflow of workloads that are shared between enterprises, in this example enterprise A's workload 222(A) and enterprise B's workload 222(B). In this example, the enterprise B workload 222(B) also includes other service(s) 224. It should be noted that both the service b 104(b) and the other service(s) 224 may constitute a bottleneck if the service 104(a) needs scaling up of resources, which the technology described herein operates to mitigate.

The workflow can be provided by way of manual loading of the architecture by a user, or by aggregating the telemetry (block 220) to obtain a workflow graph 226. Such a workflow graph 226 is 'inverted' in that the outputs are data structures/objects, and edges indicate service(s) that can take such an object as an input and process that object for an object output. Note that the SLAs/SLOs (block 228) are shared with the provider 102.

Figure 3:
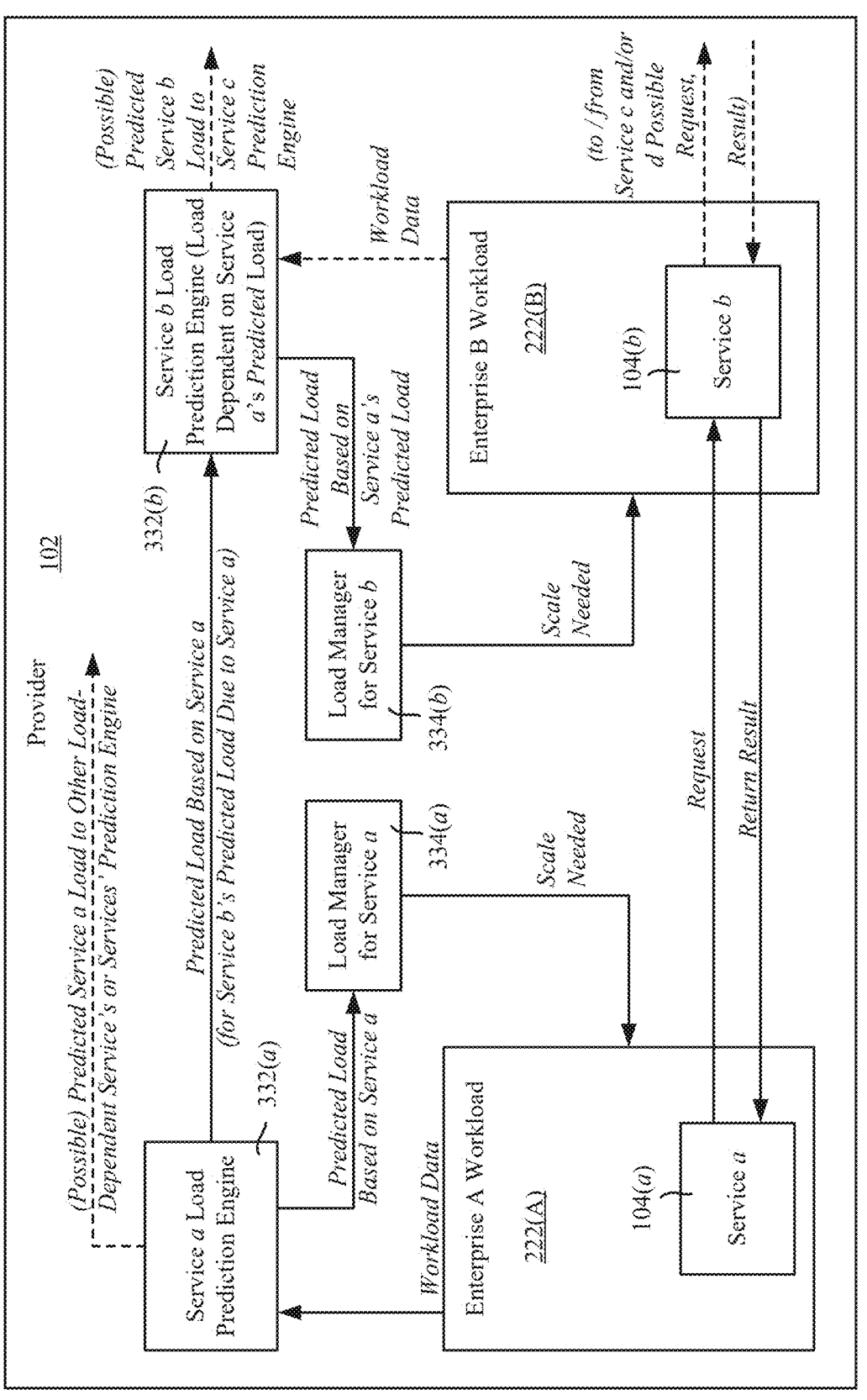
FIG. 3 is a flow diagram showing example operations for predicting a first workload for a first service, and using that predicted a first workload to predict a second workload for a second service, in accordance with various embodiments and implementations of the subject disclosure.

FIG. 3 shows the concept of determining one workload's scale (of resources) on which another workload's scale (of resources) is dependent. In FIG. 3, the workload of enterprise A 222(A), corresponding to the service 104(a) impacts the workload of enterprise B 222(B) corresponding to the service 104(b); the workload 222(B) is thus dependent on the workload 222(A).

As shown in FIG. 3, a load prediction engine 332(a) predicts a predicted load for the workload 222(A)/service 104(a), e.g., based on the state of current and/or expected number of requests that need to be or will be processed by the service 104(a). Note that the load prediction engine 332(a) can be any suitable workload predictor and/or anomaly detector, that is, using any known implementation that can be used to determine the scale of resource usage for the service 104(a); such workload prediction already occurs in other existing systems, and is thus not described herein in detail.

Because in this example the service 104(a) is part of a value chain, increasing its scale without increasing the scale of other services (including the service 104(b)) along the value chain's flow graph can create a bottleneck. To avoid or at least mitigate such a bottleneck, the workflow graph 226 (FIG. 2) that was constructed to represent the value chain is used, along with defining the problem as a circulation problem, with the new required scale for the first scaling service 104(a) as a lower bound on the workflow.

With the general workflow network and this lower bounded flow, this circulation can be based on the adaptation of ensuring an edge between the sink (final or next service 104(b)) to the source (workflow initiator) service 104(a)), with a lower and upper bound of the new scale that is needed. In an edge case where the scale cannot be achieved, the bounds may be modified. Such a problem can be solved with the well-known Edmonds-Karp, Tarjan or Tardos' algorithms. Note that there can be other flows as part of the workflow, and if so, these processes also dictate a lower bound on their respective flow parts. In any event, the flow that is determined dictates the new scale. It should be noted that the flow can be described in terms of operations/time, but because different services have different values for such data, the actual scale determination may be constructed by incorporating the appropriate ratios.

Once the load is predicted for the service 104(a) by the load prediction engine 332(a), the predicted load is sent to a load manager, which in this example is a per-service (per-workload) load manager 334(a). The load manager 334(a) uses the predicted load to allocate the appropriate amount and type of resources that will be needed by the service 104(a) to efficiently handle its input data, which increases or decreases over time as demand for the enterprise's services changes. Note that the enterprise can have a load manager for more than one service, in which the load manager tracks resource allocation per workload/per service.

Further, because of the value chain dependency relationship of the service 104(b), as described herein the predicted load for service 104(a) is also sent to a load prediction engine 332(b) for the service 104(b); note that there can be one general load prediction engine, with a load prediction instance or the like for each service. The load prediction engine 332(b) determines a predicted load for the for the service 104(b) based (at least in part) on the predicted load for the service 104(a), as well as based on any other relevant information, such as current load and any additional load data, e.g., related to sending and receiving data to and from a next service in the value chain.

As shown in FIG. 3, it is possible for the service 104(a) to be coupled to yet one or more other services, e.g., to obtain more than one result from two or more services that are then combined into a desired result. If so, the predicted load determined by the load prediction engine 332(a) for the service 104(a) is also sent to these one or more other services. Similarly, the load prediction engine 332(b) sends the load prediction for the service 104(b) workload to any other service that is load-dependent on the predicted workload for the service 104(b), e.g., for services c and d, and so on for any other service in the value chain.

It should be noted that in addition to scaling up resources for services, the technology described herein can predict scaled down resource needs. Thus, for example, if the number of requests to be handled by the service 104(a) diminishes, the load prediction engine 332(a) informs the other load prediction engine 332(b) (and any other load-dependent services with respect to the service 104(a)) of the updated predicted workload of the service 104(a). This updated predicted workload of the service 104(a) can change the updated predicted workload of the service 104(b), and as such propagates through the value chain. Note that in general spinning up resources takes more time than deallocating resources, as spin down time is not relevant to mitigating bottlenecks. Thus, the load prediction engine 332(a) may back off a predicted load slowly, e.g., reduce to ninety percent of current resource allocation for one time period, then to eighty percent for a next time period, and so on until the desired resource allocation for the updated predicted load level is reached. This can be done so that if the predicted load again increases before the scaling down is fully achieved, any potential bottleneck is at least smoothed by having more resources available via a slower decay function for the deallocation compared to deallocating them abruptly based on a newly updated load level.

Figure 4:
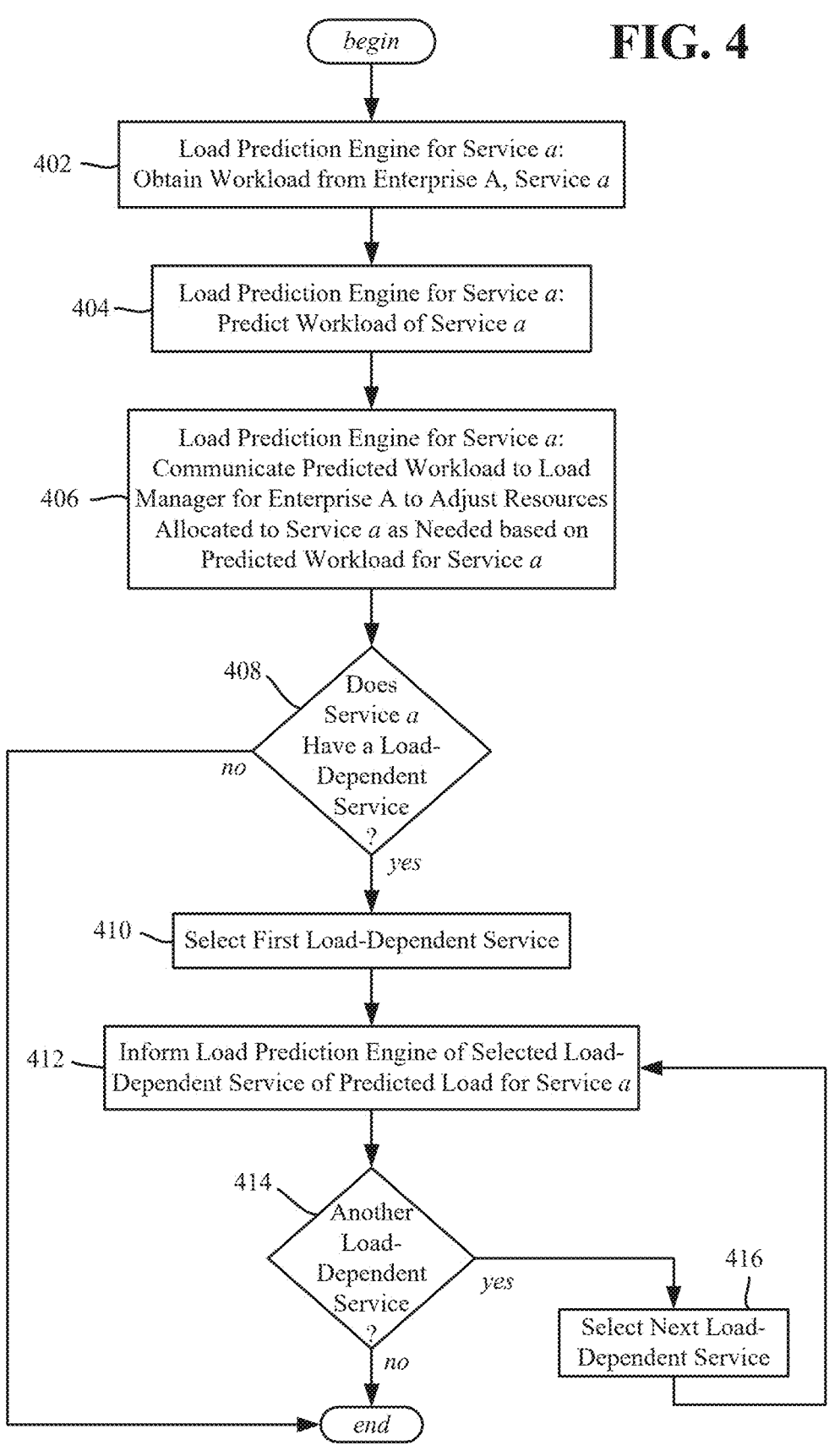
FIG. 4 is a flow diagram showing example operations related to predicting a load for a first service and informing at least one other load-dependent service of the predicted load, in accordance with various embodiments and implementations of the subject disclosure.

FIG. 4 shows example logic of determining the predicted load of one service a of an enterprise A and scaling one or more other services of other enterprise(s) based on the predicted load; in general, the operations of FIG. 4 are performed by the load prediction engine for the service a. Operation 402 of FIG. 4 represents obtaining the workload for the service a, which can include the current workload state as well as an expected workload based on prior collected data. Operation 404 predicts the workload of service a based on the workload state data, and operation 406 sends the predicted workload to the load manager instance for service a, which then allocates (scales) the resources for service a according to the predicted workload. Note that the load manager can be per service of the enterprise, or for the entire enterprise's service, with intelligence to allocate resources on a per-service basis.

Operation 408 represents evaluating whether the service a has any workloads associated with it in a value chain that are load-dependent on the load of service a, that is, whether the load of service a will impact the resource allocation of another service. In this example, as described herein, there is at least one such load-dependent service, e.g., service b of a different enterprise B, whereby operation 408 branches to operation 410 to select the load dependent service. Operation 412 represents informing the load prediction engine of the selected load-dependent service of the predicted load for the service a. Operations 414 and 416 repeat the selecting and informing of any other load-dependent service that is directly impacted by the predicted load for the source service a.

Figure 5:
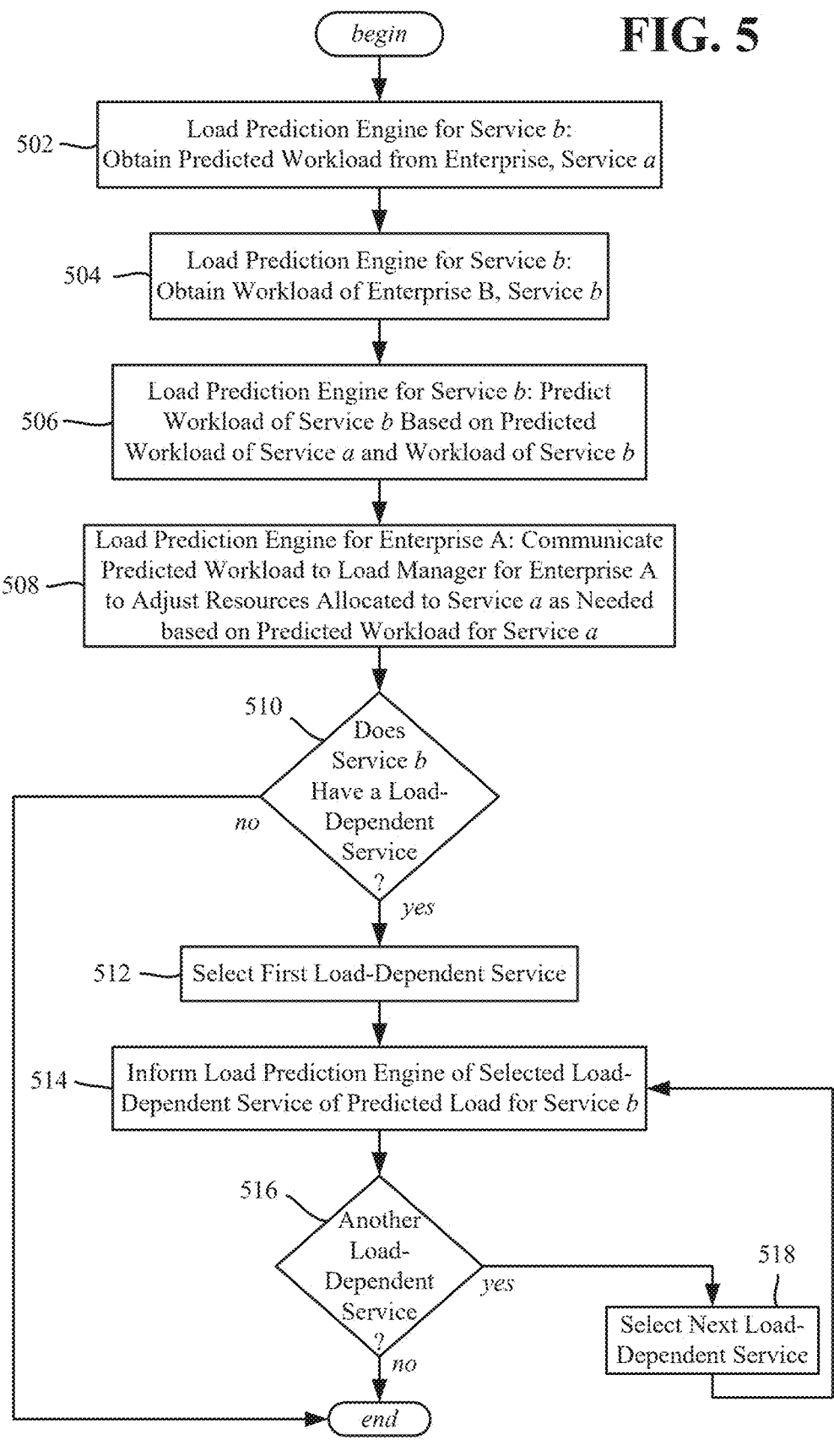
FIG. 5 is a flow diagram showing example operations related to obtaining a predicted load from another service and taking action based on that predicted load, in accordance with various embodiments and implementations of the subject disclosure.

FIG. 5 shows example logic of determining the predicted load of one service b of an enterprise B and scaling one or more other services of other enterprise(s) based on the predicted load; in general, the example operations of FIG. 5 are performed by the load prediction engine for the service b.

Operation 502 of FIG. 5 represents obtaining the predicted workload for the service a, e.g., corresponding to operation 412 of FIG. 4. Operation 504 represents obtaining the workload for the service b, which can include the current workload state or the service b as well as an expected workload based on prior collected data. Operation 506 predicts the workload of service b based on the predicted workload of service a and the workload state data of the service b; this is thus unlike operation 404 of FIG. 4 because operation 506 also is based on the predicted workload of service a. Operation 508 sends the predicted workload to the load manager instance for service b, which then allocates (scales) the resources for service b according to the predicted workload for the service b.

Operation 510 represents evaluating whether the service b has any workloads associated with it in a value chain that are load-dependent on the load of service b, that is, whether the load of service b will impact the resource allocation of another service. In this example, as described herein, consider that (as in FIG. 1) there is at least one such load-dependent service, e.g., service c of a different enterprise C, whereby operation 510 branches to operation 512 to select the load dependent service c. Operation 514 represents informing the load prediction engine of the selected load-dependent service c of the predicted load for the service b. Operations 516 and 518 repeat the selecting and informing of any other load-dependent service that is directly impacted by the predicted load for the source service b, e.g., the service d of enterprise D in FIG. 1.

Thus, the example operations of FIG. 4 are for the first service in the value chain, and the example operations of FIG. 5, in which the prediction is based (at least in part) on a source service in the value chain are for each further, load-dependent service(s) in the value chain. In general, the load prediction engine for service c in this example, via the example operations of FIG. 5, similarly predicts the load for the service c based on the predicted load for the service b, and so on for each next load-dependent service.

It should be noted that the example operations of FIGS. 4 and 5 are nonlimiting examples of propagating predicted loads through a value chain to allocate resources for the value chain's services, and that other ways to do so can be employed in a straightforward manner. For example, a scaling manager or the like can receive the predicted load from the first source service in the value chain, and distribute the predicted load to the next load-dependent service(s) and load manager(s) in the value chain, receive the next predicted load(s), distribute the next predicted load(s) to the next load-dependent service(s) and load manager(s) in the value chain, and so on until each service in the value chain is scaled according to its source service's predicted load.

Turning to another concept, pricing optimization may be integrated into the technology by adding cost of units of flow according to the estimated cost of operations, and thereby also integrate cost into the optimization. On the business side, the pricing scheme for the scaling across the value chain may be dictated by the kind of contracts that are in place. For example, if in FIGS. 1-3 enterprise B has a capital expenditure (CapEx) contract with the provider 102, and the scale is within the bounds of this contract, there is no need for reimbursement from enterprise A to enterprise B. Likewise, if enterprise A's contract with B dictates a CapEx service and the scale was within bounds, or if the service's operating expenses (OpEx) and payment is per request, there is no need for reimbursement (unless the scale caused specialized costs with B's provider).

However, if enterprise A's contract with enterprise B is CapEx and the scale requirement goes above the CapEx agreement, and enterprise B's contract with the provider is OpEx or CapEx that goes above the agreement, compensation may be in order and may be facilitated.

One or more concepts described herein can be embodied in a system, such as represented in the example operations of FIG. 6, and for example can include a memory that stores computer executable components and/or operations, and at least one processor that executes computer executable components and/or operations stored in the memory. Example operations can include operation 602, which represents obtaining, by a first load prediction engine of the system, first workload data representative of a first workload of a first service running via a provider platform corresponding to a first enterprise. Example operation 604 represents determining predicted workload data based on the first workload data. Example operation 606 represents communicating the predicted workload data to a first load manager to allocate first resources, corresponding to the first predicted workload data, for running the first service with the first resources. Example operation 608 represents communicating the predicted workload data to a second load prediction engine of the system that is coupled to a second load manager that allocates second resources, based on the predicted workload data, for a second service running via the provider platform corresponding to a second enterprise.

Determining the predicted workload data based on the first workload data can include evaluating prior workload data associated with the first workload data in conjunction with at least one of: current state data representative of a current state associated with the first service or expected state data of information for processing by the first service.

The first service can send respective request data to the second service, the first service, in response to the respective request data, can receive respective result data from the second service, and the current state data or the expected state data can correspond to an amount of the respective request data to be sent from the first service to the second service.

Further operations can include communicating the predicted workload data to a third load prediction engine that is coupled to a third load manager that allocates third resources, based on the predicted workload data, for a third service running in the provider platform for a third enterprise.

The predicted workload data can be first predicted workload data, and further operations can include obtaining, by the second load prediction engine, second workload data representative of a second workload of the second service, and predicting, by the second load prediction engine, second predicted workload data based on the second workload data and the first predicted workload data; the second load manager can allocate the second resources based on the second predicted workload data. Further operations can include communicating the second predicted workload data to a third load prediction engine that is coupled to a third load manager that allocates third resources, based on the second predicted workload data, for a third service running in the provider platform corresponding to a third enterprise.

The predicted workload data can result in the first load manager scaling up the first resources allocated to the first service relative to a previous first resource allocation, and the predicted workload data can result in the second load manager scaling up the second resources allocated to the second service relative to a previous second resource allocation.

The predicted workload data can result in the first load manager scaling down the first resources allocated to the first service relative to a previous first resource allocation, and the predicted workload data can result in the second load manager scaling down the second resources allocated to the second service relative to a previous second resource allocation.

The first workload of the first service and the second workload of the second service can include healthcare-related workloads.

The first workload of the first service and the second workload of the second service can include financial data-related workloads.

One or more example embodiments, such as corresponding to example operations of a method, are represented in FIG. 7. Example operation 702 represents obtaining, by a system comprising at least one processor, first predicted workload data representative of a first predicted workload of a first service configured for execution via computing equipment of a provider platform. Example operation 704 represents predicting, by the system based on the first predicted workload data, second predicted workload data representative of a second predicted workload of a second service configured for execution via the computing equipment of the provider platform, wherein the first service corresponds to a first enterprise and the second service corresponds to a second enterprise that is different from the first enterprise, and wherein the first service sends respective query data to the second service and the second service returns respective response data to the first service in response to the respective query data. Example operation 706 represents allocating, by the system, resources to the second service based on the second predicted workload data.

Further operations can include accessing, by the system, relationship information indicating that the first service has a query-response relationship with the second service.

Obtaining the first predicted workload data can include predicting the first predicted workload data based on prior workload data corresponding to the first service, and at least one of: current state data or expected state data of information to be processed by the first service.

The respective query data can be first respective query data, the respective response data can be first respective response data, and further operations can include predicting, by the system based on the first predicted workload data, third predicted workload data representative of a third predicted workload of a third service configured for execution via the computing equipment of the provider platform; the third service can correspond to a third enterprise that is different from the first enterprise and the second enterprise, and the first service can send respective second query data to the third service and the third service can return respective second response data to the first service in response to the respective second query data.

The respective query data can be first respective query data, the respective response data can be first respective response data, and further operations can include predicting, by the system based on the second predicted workload data, third predicted workload data representative of a third predicted workload of a third service configured for execution via the computing equipment of the provider platform; the third service can correspond to a third enterprise that is different from the first enterprise and the second enterprise, and the second service can send respective second query data to the third service and the third service can return respective second response data to the second service in response to the respective second query data.

Further operations can include communicating, by the system, query data from the first service to the second service, and communicating, by the system, response data from the second service to the first service in response to the communicating of the query data.

FIG. 8 summarizes various example operations, e.g., corresponding to a machine-readable medium, comprising executable instructions that, when executed by at least one processor of a provider platform, facilitate performance of operations. Example operation 802 represents obtaining, at a first workload prediction engine, first workload data representative of a first workload of a first service executing via the provider platform for a first enterprise. Example operation 804 represents communicating first predicted workload data, predicted by a first workload prediction engine based on the first workload data, to a first load manager to allocate first resources, corresponding to the first predicted workload data, for executing the first service with the first resources. Example operation 806 represents determining that a second service executing via the provider platform for a second enterprise has a dependency relationship with the first service, in which the first workload impacts a second workload of the second service. Example operation 808 represents communicating the first predicted workload data to a second workload prediction engine to obtain second predicted workload data, based on the first predicted workload data, from the second workload prediction engine. Example operation 810 represents communicating the second predicted workload data to a second load manager to allocate second resources, corresponding to the second predicted workload data, for executing the second service with the second resources.

Further operations can include communicating the predicted workload data to a third load prediction engine that is coupled to a third load manager that allocates third resources, based on the predicted workload data, for a third service executing via the provider platform for a third enterprise.

Further operations can include communicating the second predicted workload data to a third load prediction engine that is coupled to a third load manager that allocates third resources, based on the second predicted workload data, for a third service executing via the provider platform for a third enterprise.

Determining the dependency relationship can be based on accessing information that indicates that the first service is configured to send respective query data to the second service, and the second service can be configured to return respective response data to the first service in response to the respective query data.

As can be seen, the technology described herein facilitates workload scaling by a shared cloud provider (e.g., a manager therein) of a value chain on an industry cloud, by modulating a company's workload based on another company's SLA/SLO and current/expected workload shared with the provider. The smart scaling of workloads of different enterprises, based on value chain load-dependency relationships, improves efficiency with respect to processing data, yet does so without sharing any workload data or internal SLA/SLO information. This adds value to enterprises that share the same industry cloud, by using the network effects of them being managed by a single cloud provider/manager that is aware of the enterprises' workloads and SLOs/SLAs, and thus can manage and automatically scale their workloads knowing of each other's situation and needs, without sharing more sensitive data, or sharing this sensitive data to other entities.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
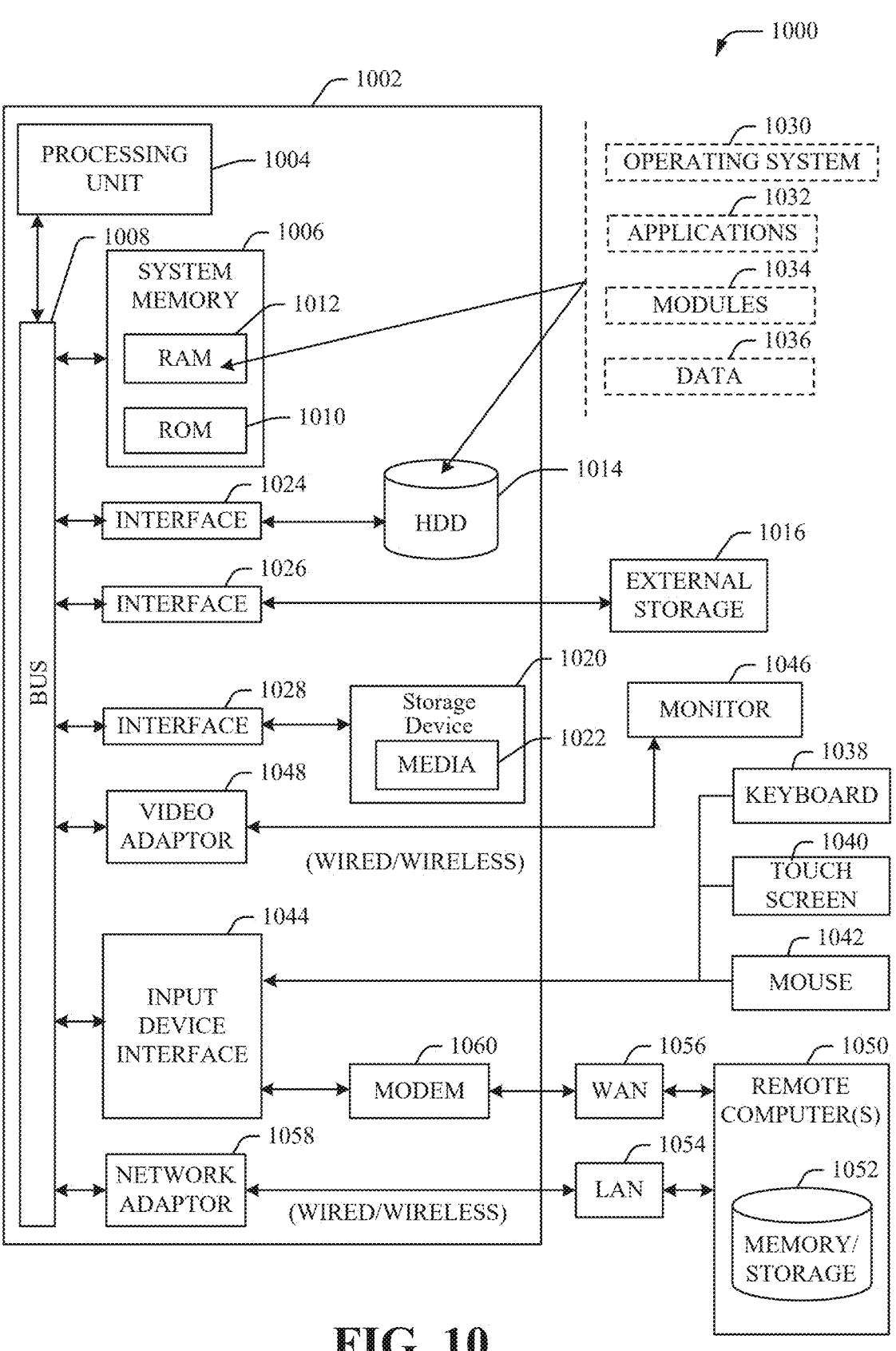
FIG. 10 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., an SSD device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (virtual machine) of multiple virtual machines hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/ wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A cloud system, comprising:
at least one processor; and
at least one memory that stores executable instructions that, when executed by the at least one processor, facilitate performance of operations, the operations comprising:
for a group of services on the cloud system associated with a common value chain of a group of enterprises, wherein there are interdependencies between respective subgroups of the services associated with the enterprises, wherein the cloud system has visibility to respective telemetry data and respective architectures associated with the respective subgroups of the services associated with the enterprises, and wherein each of the enterprises does not have visibility to the respective telemetry data and the respective architectures associated with the respective subgroups of services associated with other enterprises of the group of enterprises:
constructing, based on the respective telemetry data and the respective architectures associated with the respective subgroups of the services, a workflow graph of the group of services and the interdependencies between the respective subgroups of the services associated with the enterprises;

obtaining, from the respective telemetry data, respective workload data representative of workloads of the subgroups of services;
allocating, based on the respective workload data, server resources of the cloud system to run the respective subgroups of the services;
based on the respective telemetry data, determining first predicted workload data associated with a first subgroup of the services associated with a first enterprise of the group of enterprises, wherein the first predicted workload data is indicative of a first predicted changed workload associated with at least one first service of the first subgroup of the services;
based on the first predicted changed workload, determining a first minimum resource scaling for the first subgroup of the services;
based on the at least one first service of the first subgroup of the services and the interdependencies between the respective subgroups of the services, determining a circulation flow through the workflow graph, wherein the circulation flow comprises:
the at least one first service, and
at least one second service of at least one second subgroup of the services, different than the first subgroup, respectively associated with second enterprises of the group of enterprises;
based on the circulation flow and the first minimum resource scaling, determining respective second minimum resource scalings for the at least one second subgroup of the services;
allocating first server resources of the server resources of the cloud system to run the first subgroup of the services based on the first minimum resource scaling; and
allocating respective second server resources of the server resources of the cloud system to run the at least one second subgroup of the services based on the respective second minimum resource scalings.

2. The cloud system of claim 1, wherein the respective telemetry data comprises at least one of: current state data representative of respective current states associated with the group of services, or expected state data of respective information for processing by the group of services.

3. The cloud system of claim 2, wherein a first service of the group of services sends request data to a second service of the group of services, wherein the first service, in response to the request data, receives result data from the second service, and wherein first data of the current state data associated with the first service or second data of the expected state data associated with the first service corresponds to an amount of the request data to be sent from the first service to the second service.

4. The cloud system of claim 1, wherein the first predicted changed workload is an increased workload from a current workload associated with the first subgroup of the services.

5. The cloud system of claim 1, wherein the first predicted changed workload is a decreased workload from a current workload associated with the first subgroup of the services.

6. The cloud system of claim 1, wherein determining the first minimum resource scaling is based further on a service level agreement associated with the first enterprise.

7. The cloud system of claim 1, wherein determining the first minimum resource scaling is based further on a service level objective associated with the first enterprise.

8. The cloud system of claim 1, wherein the common value chain is associated with healthcare-related workloads.

9. The cloud system of claim 1, wherein the common value chain is associated with financial data-related workloads.

10. A method, comprising:

for a group of services on a cloud system, comprising at least one processor, associated with a common value chain of a group of enterprises, wherein there are interdependencies between respective subgroups of the services associated with the enterprises, wherein the cloud system has visibility to respective telemetry data and respective architectures associated with the respective subgroups of the services associated with the enterprises, and wherein each enterprise of the enterprises does not have visibility to the respective telemetry data and the respective architectures associated with the respective subgroups of services associated with other enterprises of the group of enterprises:

constructing, by the cloud system, based on the respective telemetry data and the respective architectures associated with the respective subgroups of the services, a workflow graph of the group of services and the interdependencies between the respective subgroups of the services associated with the enterprises;

obtaining, by the cloud system, respective workload data representative of workloads of a first the subgroups of services;

allocating, by the cloud system, based on the respective workload data, server resources of the cloud system to run the respective subgroups of the services based on the respective telemetry data, determining, by the cloud system, first predicted workload data associated with a first subgroup of the services associated with a first enterprise of the group of enterprises, wherein the first predicted workload data is indicative of a first predicted changed workload associated with at least one first service of the first subgroup of the services;

based on the first predicted changed workload, determining, by the cloud system, a first minimum resource scaling for the first subgroup of the services;

based on the at least one first service of the first subgroup of the services and the interdependencies between the respective subgroups of the services, determining, by the cloud system, a circulation flow through the workflow graph, wherein the circulation flow comprises:

the at least one first service, and at least one second service of at least one second subgroup of the services respectively associated with second enterprises of the group of enterprises;

based on the circulation flow and the first minimum resource scaling, determining, by the cloud system, respective second minimum resource scalings for the at least one second subgroup of the services;

allocating, by the cloud system, first server resources of the server resources of the cloud system to run the first subgroup of the services based on the first minimum resource scaling; and allocating, by the cloud system, respective second server resources of the server resources of the cloud system to run the at least one second subgroup of the services based on the respective second minimum resource scalings.

11. The method of claim 10, wherein the respective telemetry data comprises at least one of: current state data representative of respective current states associated with the group of services, or expected state data of respective information for processing by the group of services.

12. The method of claim 11, wherein a first service of the group of services sends request data to a second service of the group of services, wherein the first service, in response to the request data, receives result data from the second service, and wherein a first part of the current state data associated with the first service or a second part of the expected state data associated with the first service corresponds to an amount of the request data to be sent from the first service to the second service.

13. The method of claim 10, wherein the first predicted changed workload is an increased workload from a current workload associated with the first subgroup of the services.

14. The method of claim 10, wherein the first predicted changed workload is a decreased workload from a current workload associated with the first subgroup of the services.

15. The method of claim 10, wherein determining the first minimum resource scaling is based further on a service level agreement associated with the first enterprise.

16. The method of claim 10, wherein determining the first minimum resource scaling is based further on a service level objective associated with the first enterprise.

17. The method of claim 10, wherein the common value chain is associated with healthcare-related workloads.

18. The method of claim 10, wherein the common value chain is associated with financial data-related workloads.

19. A non-transitory machine-readable medium, comprising executable instructions that, when executed by at least one processor of a cloud system, facilitate performance of operations, the operations comprising:

for a group of services on the cloud system associated with a common value chain of a group of enterprises, wherein there are interdependencies between respective subgroups of the services associated with the enterprises, wherein the cloud system has visibility to respective telemetry data and respective architectures associated with the respective subgroups of the services associated with the enterprises, and wherein each enterprise of the enterprises does not have visibility to the respective telemetry data and the respective architectures associated with the respective subgroups of services associated with other enterprises of the group of enterprises:

constructing, based on the respective telemetry data and the respective architectures associated with the respective subgroups of the services, a workflow graph of the group of services and the interdependencies between the respective subgroups of the services associated with the enterprises;

obtaining, from the respective telemetry data, respective workload data representative of workloads the subgroups of services;

allocating, based on the respective workload data, server resources of the cloud system to run the respective subgroups of the services;

based on the respective telemetry data, determining first predicted workload data associated with a first subgroup of the services associated with a first enterprise of the group of enterprises, wherein the first predicted workload data is indicative of a first predicted changed workload associated with at least one first service of the first subgroup of the services;

based on the first predicted changed workload, determining a first minimum resource scaling for the first subgroup of the services;

based on the at least one first service of the first subgroup of the services and the interdependencies between the respective subgroups of the services, determining a circulation flow through the workflow graph, wherein the circulation flow comprises:

the at least one first service, and at least one second service of at least one second subgroup of the services respectively associated with second enterprises of the group of enterprises;

based on the circulation flow and the first minimum resource scaling, determining respective second minimum resource scalings for the at least one second subgroup of the services;

allocating first server resources of the server resources of the cloud system to execute the first subgroup of the services based on the first minimum resource scaling; and allocating respective second server resources of the server resources of the cloud system to execute the at least one second subgroup of the services based on the respective second minimum resource scalings.

20. The non-transitory machine-readable medium of claim 19, wherein the respective telemetry data comprises at least one of: current state data representative of respective current states associated with the group of services, or expected state data of respective information for processing by the group of services.

* * * * *